Figure 4:
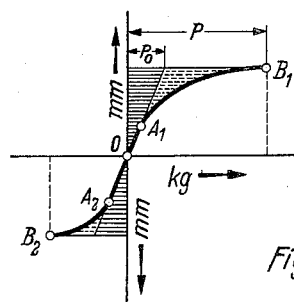

Feb. 7, 1956   J. MÜLLER   2,733,934
VEHICLE SUSPENSION
Filed Feb. 17, 1950   2 Sheets-Sheet 1
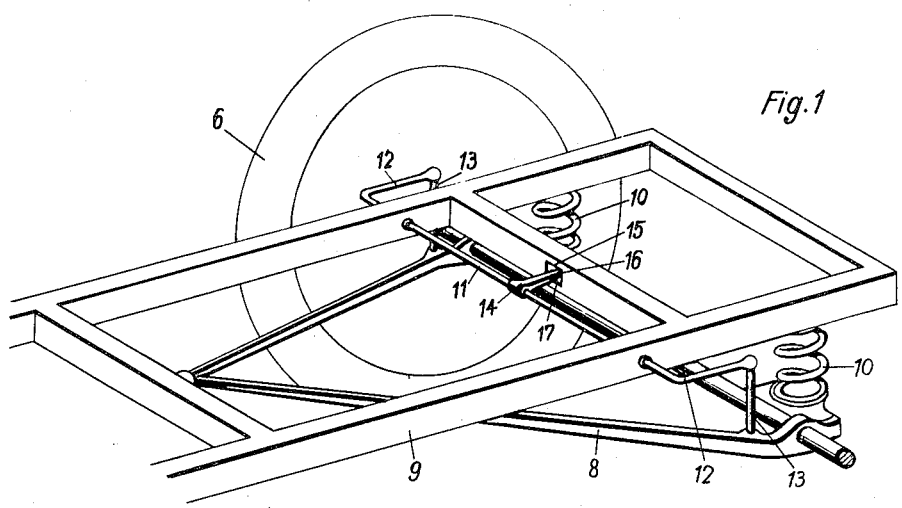
Fig.1
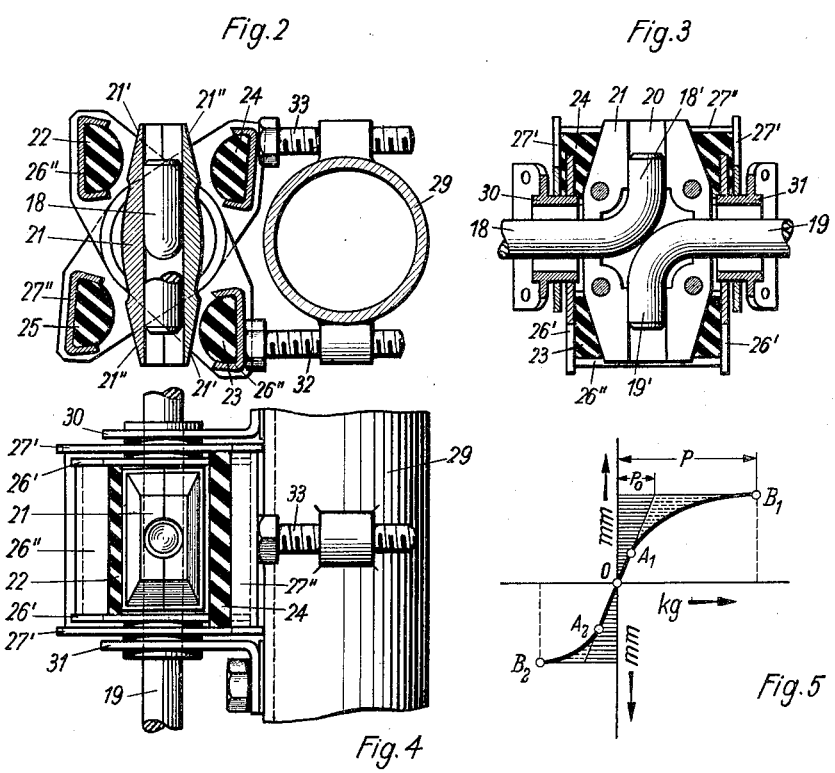
Fig.2  Fig.3

Fig.5
INVENTOR.
JOSEF MÜLLER
BY Dicke and Padlon
ATTORNEYS.

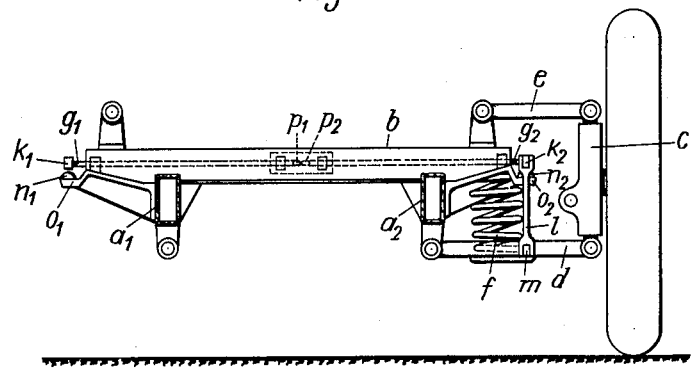
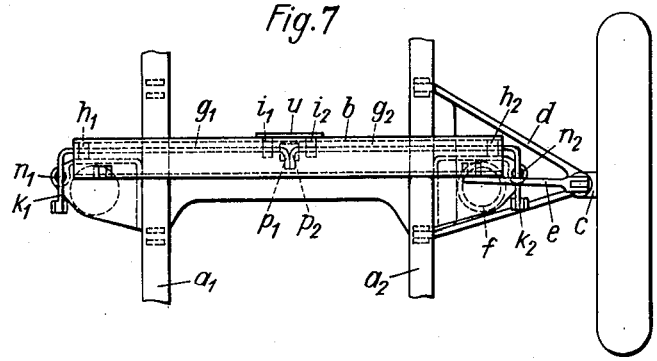
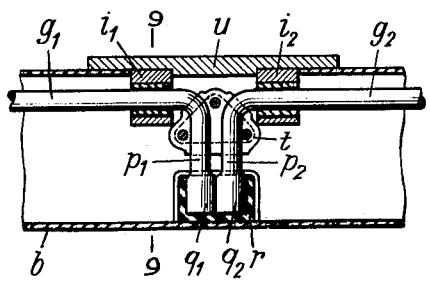
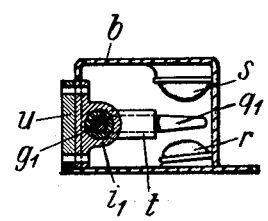

United States Patent Office
2,733,934
Patented Feb. 7, 1956

2,733,934

VEHICLE SUSPENSION

Josef Müller, Stuttgart, Germany, assignor to Daimler-Benz Aktiengesellschaft, Stuttgart-Untertürkheim, Germany Application February 17, 1950, Serial No. 144,820

Claims priority, application Germany February 22, 1949

27 Claims. (Cl. 280—124)

This invention relates to vehicle suspensions and has for an object to provide spring suspension mechanism for vehicles including spring means distorted by movement of a wheel relative to the frame, stabilizer means, or anti-sway means, viz., a device for resiliently restraining unequal movements of the wheels relative to the frame together with means which come into play to aid the first mentioned spring means after a predetermined deformation thereof.

Another object is to provide such a vehicle suspension in which use is made of the stabilizer means to aid the suspension spring means after a predetermined deformation of said suspension spring means in either direction.

Another object is to provide such a construction including suspension springs and resilient stabilizer means so arranged that while the suspension springs are not distorted beyond a certain point or the algebraic sum of their distortions does not exceed a certain value, the vehicle weight is supported entirely by said suspension springs and wherein the stabilizer means is distorted only in proportion to the difference between the wheel movements relative to the frame, provisions being made, however, whereby if the algebraic sum of the distortions of the suspension springs exceeds a certain predetermined value the stabilizer means come into play to aid the suspension springs and to carry part of the weight of the car. To this end, free motion of the stabilizer means is limited by stop means which come into play upon the occurrence of unidirectional movements of the wheels of equal amount or whose algebraic sum reaches a certain value.

Another object is to provide stabilizer or anti-sway means which under certain conditions also aid in supporting the weight of the vehicle.

It is a still further object of the present invention to provide such a type of suspension which may be realized in a particularly convenient manner by using torsion springs, in particular torsion rods connecting the guide members of oppositely located wheels with each other and by using stop means, preferably located within the central portion of the torsion springs to render the spring means operative in case of unidirectional strokes.

The adoption of the invention therefore permits without the necessity of additional spring devices the use, for instance, of the already built-in spring device which is employed for stabilizing the car when cornering for simultaneously obtaining a progressively operating springing when the car strikes obstacles. It will thus be possible to obtain with a lowest possible number of parts and a simple space and weight economizing arrangement most favorable springing properties. In particular it is also possible to provide a specially soft main suspension with a great total spring stroke, since the invention permits a very efficient and adaptable arresting of the curve stabilizing spring device means to obtain a progressive effect.

It is still another object of the present invention to provide a torsion rod stabilizer arrangement which may be easily installed by the use of two torsion rods appropriately shaped at their respective ends.

Still another object of the present invention resides in the provision of a connection for the two halves of the torsion rods at their inner ends which may also be readily installed with the torsion rods emplaced and which, at the same time, constitutes an arm means cooperating with the stop means associated with the vehicle body.

Still another object of the present invention resides in the provision of a stabilizer arrangement which is economical from a space-saving point of view and which, at the same time, protects the stabilizer as well as the stop means within a frame member to prevent untimely wear and tear due to exposure to the elements and dirt from the road.

A still further object of the present invention is the provision of a spring system for vehicles which offers very favorable springing properties with the lowest possible number of parts and which permits the use of relatively soft main springs.

Another object of the present invention is the provision of a spring system which simultaneously offers a simple arrangement, economical as regards weight and space, by utilizing the already built-in spring device employed for purposes of stabilizing the vehicle while traversing a curve, and offering a progressively effective springing action.

It is still another object of the present invention to provide a stabilizer spring suspension of the type described hereinabove which may be readily adjusted to provide for any desired operation.

It is to be understood that the word "frame" as used herein is not to be limited to an assemblage of beams, bars, and braces separate from the body of the vehicle proper, but is intended to relate also to vehicles of the type where the body itself is so constructed as to eliminate the necessity for a separate frame.

Further features and advantages of the invention will become evident from the following description of examples of construction. In the drawings Fig. 1 shows by way of example a perspective view of the suspension according to the invention as adapted to the rigid rear axle of a motor vehicle, Figures 2 to 4 show by way of example one form of embodiment of the stop means as applied to the central portion of a torsion rod; Fig. 2 being a cross sectional view of said stop means, Fig. 3 a side elevation partially in cross section, and Fig. 4 a top plan view of the same, Fig. 5 shows a springing diagram for the vehicle axle, Fig. 6 shows a cross section through a frame having a stabilizer arranged in a frame cross member or transverse bearer and illustrates by way of example the suspension of a wheel, Fig. 7 is a top plan view of the arrangement in Fig. 6, Fig. 8 is a horizontal longitudinal section through the centrally located stop means for the stabilizer of Fig. 7 on an enlarged scale, Fig. 9 is a cross section taken on the line 9—9 in Fig. 8.

Referring now to Fig. 1, the rear wheels 6 of the vehicle are mounted on a rigid axle 7 which is supported on the frame 9 in the longitudinal direction by radius rods 8 and supports the frame by helical springs 10. To prevent lateral movement of the axle any known means, e. g., a vertical guide way, a transverse swinging arm or the like may be provided.

The opposite ends of the vehicle axle are coupled with a torsion rod 11 (a so-called "stabilizer") which latter is mounted in or on the side members of the frame 9. The ends 12 of said torsion rod are bent so as to extend in the longitudinal direction of the vehicle and are articulated to the vehicle axle by means of links 13. According to the invention the torsion rod is provided in its a middle with an arm 14 engaging a slot 15 of the frame cross member with a certain play, the upper and lower stop surfaces 16 and 17 respectively of the slot 15 serving as abutments for the arm 14 of the torsion rod.

The mode of operation of the invention illustrated in the drawing is as follows:

The occurrence of oppositely directed strokes of the wheels of equal amount, i. e. in a slanting position of the axle with relation to the frame about an axis lying in the longitudinal central plane of the vehicle, causes the torsion rod 11 to be subjected to torsional stress owing to the fact that its one end 12 is turned upwardly whilst the other end is turned downwardly with relation to the frame. The two ends of the torsion rod are accordingly twisted in opposite directions, the central portion of the spring and the arm 14 maintaining their positions, thus forming the neutral point of the spring with respect to the oppositely directed strokes of the wheels of equal amount. One of the springs 10 is thus further compressed and the other relieved.

With unidirectional strokes of the wheels of equal amount, i. e. with a springing movement of the axle 7 parallel to the frame, the torsion rod 11 at first remains unstressed owing to the play of arm 14 in the slot 15, since it is turned in its journals in accordance with the parallel movement of the axle without being subjected to torsion. In this case the movement is exclusively cushioned by the main springs 10. As soon as the arm 14 abuts the upper or the lower stop means 16 and 17 respectively of the slot 15 a further free rotation of the torsion rod about its axis is prevented. A further lifting movement of the axle causes a springing action of the torsion rod, as if it would consist of two separately existing torsion rods secured at the middle of the vehicle, each half of the torsion rod cushioning the corresponding side of the vehicle axle in addition to the action of the springs 10. These springs 10 and 11 are in this case connected in parallel with respect to their action so that their cooperation results in a higher spring rate.

Unidirectional strokes of the wheels (when the car strikes obstacles) are accordingly sprung at first only by the main springs 10, i. e. comparatively softly but after having surpassed a predetermined limiting position the wheels are sprung additionally by the torsion rod 11 thus providing comparatively hard springing. By correspondingly dimensioning the two types of springs it is therefore possible to obtain the progressive spring rate appropriate for any particular condition.

It is, of course, also possible to provide a corresponding arrangement in the case of independently suspended wheels, e. g., by a parallelogram, oscillating axle shafts or the like. Instead of a torsion rod also other suitable spring means may be used which behave in a similar way as the torsion rod illustrated in the example of construction. It is likewise possible to provide in substitution of the helical springs used for the main springing system any other spring means, possibly of the kind responding substantially or principally only to unidirectional but not to oppositely directed strokes of the wheels, such as an equalizing suspension.

A particularly convenient support of a torsion rod to obtain a progressive action is illustrated in Figs. 2 to 4. The torsion rod is in this case subdivided for reasons of manufacture and provides two torsion rod halves 18 and 19, the abutting ends 18' and 19' of which are bent at right angles and clamped in bores 20 of a two-piece housing 21 so that the ends of the torsion rods 18 and 19 are rigidly coupled both with each other and with the housing 21.

The housing 21 serves in this case as a double-armed lever or movable arm, the lateral stop faces 21', 21" cooperating in pairs with the rubber buffers 22, 23, 24, 25 serving as fixed stop means. The rubber buffers 22, 23 and 24, 25 respectively located opposite to each other are fixed to double-armed levers 26 and 27 respectively arranged crosswise with relation to each other, these levers being mounted concentrically with the torsion rods 18, 19 in journals 30, 31 secured to the frame 29 and consisting of the two end plates 26' and 27' respectively forming the double-armed lever and of the two channel-shaped members 26" and 27" respectively holding the rubber buffers. The lever 26 in this case abuts with one of its channel-shaped members 26" against an adjusting screw 32 being adjustable in a lug on the frame member 29. Likewise, the lever 27 rests with one of its channel-shaped members 27" against a correspondingly arranged adjusting screw 33.

The mode of operation of the cushioning system will be evident from the diagram in Fig. 5. In this diagram there is plotted from the zero position in the vertical direction the springing stroke of the axle, viz. in the case of unidirectional strokes of the wheels of equal amount upward and downward, while in the horizontal direction the reaction force of the suspension is plotted as a function of the stroke. The area shaded with full lines represents the springing diagram of the main spring, whilst the auxiliary spring means after the torsion rod has become active when the car strikes obstacles, is shaded with dashed lines.

As is evident from the drawing, the coupling member 21 of the torsion rods 18, 19, which is designed as a double-armed lever and abutting arm, is arranged between the resilient rubber buffers 22 to 25 located at the frame in such a manner that it can play freely between said rubber buffers for a predetermined range of rotation. This range is indicated in the diagram in Fig. 5 by the points $A_1$ and $A_2$. At point $A_1$, e. g., the arm 21 abuts with its two stop faces 21' against the rubber buffers 22 and 23, the latter being so designed that they first offer a comparatively low resistance to a further rotation of the arm 21, that resistance increasing only gradually in conformity with the desired curve $A_1$—$A_2$ in Fig. 5. A maximum stroke therefore produces a reaction force P amounting to a multiple of the reaction force $P_0$ which would be obtained by the main spring alone. Thereby the advantage is obtained that the main springing system may be made extremely soft without there being the danger of inadmissibly long strokes of the springs. By appropriately shaping the rubber members it is simultaneously possible to avoid an abrupt transition from the curve O—$A_1$ into the curve $A_1$—$B_1$ and to make the same as smooth as possible.

A corresponding mode of operation is obtained in the case of a parallel downward springing movement of the axle since at first until reaching point $A_2$ the main springing system alone will be effective. At this point the stop faces 21" abut on the rubber buffers 24 and 25 respectively thereby effecting a progressive springing action as far as point $B_2$.

The adjusting screws 32 and 33 permit increasing or diminishing the play between the stop faces 21' and the resilient abutments 22, 23 and between the stop faces 21" and the resilient abutments 24, 25 respectively which allows giving the points $A_1$ and $A_2$ respectively any desired position on the line $A_1$—$A_2$. In the example of construction shown in the drawing, for instance, the point $A_1$ is positioned at a smaller distance from the zero-position than point $A_2$, so that the stronger spring resistance becomes effective earlier during the upward springing movement of the wheels than with a downward movement of the wheels.

By the arrangement of the stop means or of the rubber buffers 22, 23 and 24, 25 respectively in pairs there is obtained the advantage that the torsion rod is relieved from transverse forces while the stop means is effective. It is, however, also possible to provide that the stop means become effective in succession which may be advantageous under certain circumstances for the progressive action of the springing system. If desired, each of the stop means of rubber buffers may be arranged for independent adjustment.

In the example of construction according to Figs. 6 to 9 the chassis frame comprises the two frame side members $a_1$ and $a_2$ which are rigidly connected to each other by a frame cross member or transverse bearer $b$. The wheel carrier $c$, for instance, of the steering wheel is guided by a bottom link $d$ and a top link $e$ and sprung against the frame by a helical spring $f$ bearing on the bottom link. Within the transverse bearer $b$ there is arranged a stabilizer composed of the two torsion rod halves $g_1$ and $g_2$ which are mounted in two outer journals $h_1$, $h_2$ and two inner journals $i_1$, $i_2$ respectively. The outer ends $k_1$ and $k_2$ respectively are bent in the form of a lever and connected by means of links 1 in a suitable manner, having regard to the swinging motion of the wheel at $m$ to the bottom link $d$. The downward stroke is in this case limited by rubber buffers $n_1$, $n_2$ which are located in pockets $o_1$, $o_2$ of brackets secured to the frame and against which the bent outer ends $k_1$, $k_2$ of the stabilizer abut.

The inner ends of the torsion rod halves $g_1$, $g_2$ are, as particularly shown in Figs. 8 and 9, likewise bent at right angles towards the same side, the bent ends $p_1$ and $p_2$ respectively being flattened at $q_1$, $q_2$ respectively and projecting with clearance into the space between a lower rubber buffer $r$ and an upper rubber buffer $s$. Both ends $p_1$, $p_2$ are rigidly connected to each other by a two-piece screw fastened coupling member $t$. The journals $i_1$ and $i_2$ are supported, for instance, on a cover piece $u$ closing an opening in the transverse bearer $b$.

Both torsion rod halves $g_1$ and $g_2$ respectively are inserted from opposite sides with the journals $i_1$, $i_2$ and $h_1$, $h_2$ respectively sleeved thereon into the frame cross member $b$ until the ends $p_1$, $p_2$ abut against each other. Thereupon the two ends are connected by the two-piece coupling member $t$ which is inserted through an opening in the transverse bearer $b$ and clamped together by three bolts. The journals $i_1$ and $i_2$ are then secured to the cover piece $u$, e. g., by screws inserted from outside, the cover piece $u$ being simultaneously secured to the transverse bearer $b$ by means of screws.

In the case of oppositely directed strokes of the wheels of equal amount the two torsion rod halves $g_1$ and $g_2$ are torsionally stressed without the central stop means entering into action. Unidirectional swinging motions of the wheels first do not cause the application of a stress on the torsion rod halves $g_1$, $g_2$ of the stabilizer as long as the ends $q_1$, $q_2$ have freedom of play between the stop means $r$ and $s$. After contacting one of these stop means the torsion rod halves $g_1$ and $g_2$ are also torsionally stressed so that the stabilizer serves to spring suspend the wheels beyond the corresponding spring strokes also for the unidirectional ones thereof.

While this description has reference to particular forms of the invention it will be obvious that various other forms and modifications may be resorted to without departing from the scope of the invention.

What I claim is:

1. Means for suspending a vehicle body relative to road wheels located opposite to each other comprising wheel carrier means, spring means for the wheels adapted to resist unidirectional strokes of the two wheels from an intermediate spring position, additional spring means comprising a torsion rod stabilizer journaled to the vehicle body and having a crank at each end connected to the respective wheel carrier means, said rod being, in an intermediate position, free to rotate during unidirectional strokes of the wheels with respect to the vehicle body in a first range of stroke and to resist substantially only oppositely directed strokes of the wheels, and stop means for the torsion rod stabilizer adapted to stop rotation of said rod after a predetermined stroke of the first spring means, thereby causing a springing action of said torsion rod by deformation also in the case of unidirectional strokes of the wheels, said stop means comprising a two-armed lever carried by said torsion rod near its center and four abutments carried by the body, two cooperating with one arm of said lever and two cooperating with the other arm of said lever to serve as stops for arresting rotation of the center part of said torsion rod after a certain degree of rotation of said rod is exceeded in either direction.

2. The combination according to claim 1 in which the pair of stops which limit movement in one direction are carried by a lever journaled upon an axis coinciding with the axis of the torsion rod and said lever is rotarily adjustable about said axis.

3. The combination according to claim 1 in which the two pairs of stops which limit movement in two directions respectively, are each carried by a lever, which levers are journaled upon an axis coinciding with the axis of the torsion rod, and said levers are individually rotarily adjustable about said axis.

4. The combination according to claim 1 in which the two pairs of stops which limit movement in two directions respectively are each carried by a pair of levers, said stops comprising channel members connected to the respective ends of said levers.

5. Means for suspending a vehicle body relative to road wheels located opposite to each other comprising frame means, wheel carrier means for suspending said wheels from said frame means, spring means for the wheels intermediate said wheel carrier means and said frame means adapted to resist unidirectional strokes of the two wheels from an intermediate spring position, additional spring means including a torsion rod extending substantially over the entire width of said vehicle and having link connections at both ends thereof connecting said wheel carrier means with each other adapted, with relation to an intermediate position, to move during unidirectional strokes of the wheels freely with respect to the car body in a first range of stroke and to resist substantially only oppositely directed strokes of the wheels, and resilient stop means for the additional spring means adapted to stop said additional spring means after a predetermined stroke of the first spring means, thereby causing said additional spring means to aid said first spring means.

6. Means for suspending a vehicle body relative to road wheels located opposite to each other comprising wheel carrier means, spring means for the wheels adapted to resist unidirectional strokes of the two wheels from an intermediate spring position, additional spring means arranged independently of said first-named spring means and connecting said wheel carrier means with each other and adapted, with relation to an intermediate position, to move during unidirectional strokes of the wheels freely with respect to the car body in a first range of stroke and to resist substantially only oppositely directed strokes of the wheels, and stop means for the additional spring means adapted to stop said additional spring means after a predetermined stroke of the first spring means, thereby causing a springing action of said additional spring means by deformation also in the case of unidirectonal strokes of the wheels, said additional spring means comprising a stabilizer spring consisting of a torsion rod journaled relative to the vehicle body and having a crank on each end connected to the respective wheel carriers, together with means carried near the center of said torsion rod and cooperating with means associated with the body for arresting rotation of the center part of said torsion rod after a certain degree of rotation is exceeded.

7. A vehicle suspension as defined in claim 6 in which said vehicle body is provided with a transverse tubular frame member, in which said torsion bar is housed within said tubular frame member and the said stops are supported by said tubular frame member.

8. Means for suspending a vehicle body relative to road wheels located opposite to each other comprising wheel carrier means, spring means for the wheels adapted to resist unidirectional strokes of the two wheels from an intermediate spring position, additional spring means independent of said first spring means connected to the wheel carrier means adapted, with relation to an intermediate position, to move during unidirectional strokes of the wheels freely with respect to the car body in a first range of stroke and to resist substantially only oppositely directed strokes of the wheels, and stop means for the additional spring means adapted to stop said additional spring means after a predetermined stroke of the first spring means, thereby causing a springing action of said additional spring means by deformation also in the case of unidirectional strokes of the wheels, said additional spring means comprising a stabilizer spring consisting of a torsion rod journaled relative to the vehicle body and having link means on each end connected to the respective wheel carriers, together with means carried within a central region of said torsion rod and cooperating with two spaced stops associated with the body for arresting rotation of the center part of said torsion rod after a certain degree of rotation in either direction is exceeded.

9. Means for suspending a vehicle body relative to road wheels located opposite to each other comprising wheel carrier means, spring means for the wheels adapted to resist unidirectional strokes of the two wheels from an intermediate spring position, additional spring means comprising a torsion rod stabilizer journaled to the vehicle body and having a crank at each end connected to the respective wheel carrier means, said rod being, in an intermediate position, free to rotate during unidirectional strokes of the wheels with respect to the vehicle body in a first range of stroke and to resist substantially only oppositely directed strokes of the wheels, and stop means for the torsion rod stabilizer adapted to stop rotation of said rod after a predetermined stroke of the first spring means, thereby causing a springing action of said torsion rod by deformation also in the case of unidirectional strokes of the wheels, the torsion rod stabilizer consisting of two halves which are directed towards each other, with means for rigidly connecting the two halves of the stabilizer with each other, said means at the same time forming the stop means provided on the stabilizer rod, which stop means cooperate with counterstops provided on the vehicle.

10. The combination according to claim 9 in which the facing ends of the stabilizer rod halves are bent and the said means for connecting the stabilizer ends firmly surround and clamp the bent ends.

11. Combination according to claim 9 in which the facing ends of the stabilizer rod halves are bent out of their axial direction in opposite directions and the means for connecting the stabilizer halves are developed in the form of a housing firmly clamped around the oppositely-bent ends of the stabilizer rod halves in the form of a housing-like double-armed lever, and each lever arm cooperates at least with one stop provided on the vehicle.

12. Combination according to claim 9 in which the stops comprise at least one buffer of elastic material.

13. Combination according to claim 9 in which the stop means comprise buffers of resilient material which are so shaped that they oppose a strong, progressively increasing resistance to rotation of the torsion bar about its axis after the entering into action with the stop means.

14. Combination according to claim 9 in which the facing ends of the stabilizer halves are bent out of their axial direction and the said means for connecting the stabilizer rod halves comprise a bipartite housing divided in the plane of the bends which housing receives the bends of the stabilizer halves in the manner of bearings, with means for firmly clamping the two parts of the housing together and upon said bent ends.

15. Combination according to claim 1 in which the said four stops provided on the body of the vehicle consist of elastic material.

16. Combination according to claim 1 in which the four stops arranged on the frame are supported in pairs diagonally on double-armed levers coaxially to the stabilizer rod and intersect mutually in the axis of the stabilizer.

17. Means for suspending a vehicle body relative to the road wheels located opposite each other comprising wheel carrier means, spring means for the wheels adapted to resist unidirectional strokes of the two wheels from an intermediate spring position, additional spring means connected to said wheel carrier means adapted, with relation to an intermediate position, to move during unidirectional strokes of the wheels freely with respect to the car body in a first range of stroke and to resist substantially only oppositely directed strokes of the wheels, and stop means for said additional spring means adapted to stop said additional spring means after a predetermined stroke of said first spring means, thereby causing a springing action of said additional spring means by deformation also in case of unidirectional strokes of the wheels, said additional spring means comprising a stabilizer spring consisting of a torsion rod journalled relative to the vehicle body and having a crank on each end connected to the respective wheel carriers, two oppositely positioned stop means on said torsion rod located near the center thereof and co-operating with one stop means each supported on the vehicle body, whereby both pairs of stop means come simultaneously in contact after a certain rotational movement of the center part of said torsion rod.

18. Apparatus according to claim 17 wherein at least one of said pairs of stop means is formed elastically.

19. Means for suspending a vehicle body relative to road wheels located opposite to each other comprising wheel carrier means, spring means for the wheels adapted to resist unidirectional strokes of the two wheels from an intermediate spring position, additional spring means arranged independently of said first-named spring means and connecting said wheel carrier means with each other and adapted, with relation to an intermediate position, to move during unidirectional strokes of the wheels freely with respect to the car body in a first range of stroke and to resist substantially only oppositely directed strokes of the wheels, and stop means for the additional spring means adapted to stop said additional spring means after a predetermined stroke of the first spring means, thereby causing a springing action of said additional spring means by deformation also in the case of unidirectional strokes of the wheels, said additional spring means comprising a stabilizer spring consisting of a torsion rod journalled relative to the vehicle body and link means on each end connecting said torsion rod to the respective wheel carriers, together with means carried within a central portion of said torsion rod and cooperating with means associated with the body for arresting rotation of the central portion of said torsion rod after a certain degree of rotation is exceeded.

20. The combination according to claim 5, wherein said frame means includes a tubular frame member arranged transversely to the direction of travel, and wherein said torsion rod is arranged within said hollow frame member.

21. In a vehicle the combination as defined in claim 20, wherein the torsion rod consists of two torsion rod halves being inserted from the ends of the frame member into the same with means for coupling the torsion rod halves with each other at their adjacent ends.

22. In a vehicle the combination as defined in claim 21, with detachably mounted journals for the torsion rod halves such that said journals together with the torsion rod halves may be inserted into the tubular frame member and then secured therein.

23. A vehicle suspension as defined in claim 6, wherein the torsion rod is divided in its middle, there being provided a coupling member connecting the spring halves and simultaneously serving as a motion limiting member for the torsion rod.

24. A vehicle suspension as defined in claim 6, wherein the torsion rod is divided and the ends of the two torsion rod halves are angularly bent, there being provided a coupling member surrounding the angularly bent ends of the spring halves thereby coupling the same.

25. In a vehicle the combination as defined in claim 5, wherein the torsion rod is composed of two torsion rod halves, and wherein said stop means comprises a coupling member for connecting the two torsion rod halves with each other, said coupling member serving simultaneously as abutting member, and abutting elements located at the frame member in the interior of the same, against which after a predetermined stroke of the torsion rod the coupling member arranged at said torsion rod abuts.

26. In a vehicle the combination as defined in claim 5 with limiting members on the torsion rod limiting the springing stroke of the wheels.

27. The combination as defined in claim 26, wherein said stroke limiting members consist of operating levers formed by the outer ends of the torsion rod, further comprising stop members at the vehicle body, said stroke limiting members limiting the downward stroke of the wheel by abutting against one of said stop members each.

References Cited in the file of this patent

UNITED STATES PATENTS

| | | |
|---|---|---|
| 123,108 | Kieser | Jan. 30, 1872 |
| 1,915,134 | MacPherson | June 20, 1933 |
| 2,127,518 | Huntman | Aug. 23, 1938 |
| 2,190,298 | Slack | Feb. 13, 1940 |
| 2,210,485 | Hawkins | Aug. 6, 1940 |
| 2,283,971 | Chambers | May 26, 1942 |
| 2,409,501 | Krotz | Oct. 15, 1946 |
| 2,483,974 | Hicks | Oct. 4, 1949 |
| 2,509,803 | Booth | May 30, 1950 |
| 2,542,363 | Sarnac | Feb. 20, 1951 |